United States Patent
Wade (10) Patent No.: US 10,902,565 B2
(45) Date of Patent: Jan. 26, 2021

(54) ENHANCED ELECTRONIC DIVE MASK SYSTEM INCORPORATING IMAGE ENHANCEMENT AND CLARIFICATION PROCESSING

(71) Applicant: Jack Wade, La Jolla, CA (US)

(72) Inventor: Jack Wade, La Jolla, CA (US)

(*) Notice: Subject to any disclaimer, the term of this patent is extended or adjusted under 35 U.S.C. 154(b) by 0 days.

(21) Appl. No.: 16/542,052

(22) Filed: Aug. 15, 2019

(65) Prior Publication Data
US 2020/0074599 A1 Mar. 5, 2020

Related U.S. Application Data

(63) Continuation of application No. 15/786,467, filed on Oct. 17, 2017.

(60) Provisional application No. 62/409,315, filed on Oct. 17, 2016.

(51) Int. Cl.
| | | |
|---|---|---|
| *B63C 11/12* | (2006.01) | |
| *G06T 5/00* | (2006.01) | |
| *B63C 11/14* | (2006.01) | |
| *G06F 3/147* | (2006.01) | |

(52) U.S. Cl.
CPC .............. *G06T 5/003* (2013.01); *B63C 11/12* (2013.01); *B63C 11/14* (2013.01); *G06F 3/147* (2013.01); *B63C 2011/121* (2013.01); *G09G 2340/12* (2013.01); *G09G 2354/00* (2013.01)

(58) Field of Classification Search
CPC .................................................... G06T 5/003
USPC .......................................................... 348/81
See application file for complete search history.

(56) References Cited

U.S. PATENT DOCUMENTS

| | | | | |
|---|---|---|---|---|
| 6,008,780 | A * | 12/1999 | Clarke | B63C 11/14 |
| | | | | 2/430 |
| 6,694,911 | B1* | 2/2004 | Gallagher | B63C 11/46 |
| | | | | 114/315 |
| 7,180,476 | B1* | 2/2007 | Guell | G01S 19/15 |
| | | | | 340/980 |
| 7,477,207 | B2* | 1/2009 | Estep | B63C 11/26 |
| | | | | 345/8 |
| 9,047,873 | B2* | 6/2015 | Schuck | G10L 15/265 |
| 9,830,713 | B1* | 11/2017 | Walker | H04N 7/181 |
| 2009/0279269 | A1* | 11/2009 | Shiue | H05K 3/284 |
| | | | | 361/757 |
| 2010/0091195 | A1* | 4/2010 | Lee | H04N 5/142 |
| | | | | 348/607 |
| 2010/0259651 | A1* | 10/2010 | Fattal | G06T 5/003 |
| | | | | 348/241 |
| 2012/0281054 | A1* | 11/2012 | Cook | H04N 7/185 |
| | | | | 348/14.01 |
| 2014/0254943 | A1* | 9/2014 | Jin | G06T 5/003 |
| | | | | 382/218 |

(Continued)

*Primary Examiner* — Leron Beck
(74) *Attorney, Agent, or Firm* — Olivo IP Law Group, P.C.; John W. Olivo, Jr.

(57) ABSTRACT

The present invention relates to an enhanced electronic diving mask with various image enhancement hardware and software integrated with a diving mask, whereby images may be enhanced to enable a diver to achieve greater visibility and clearer vision while underwater. Notably, the present invention combines techniques that have previously been used in connection with internal patient surgical procedures, so that medical instrument imaging technology used inside the human body may for the first time be used to afford divers clearer vision, more visibility and greater safety.

5 Claims, 3 Drawing Sheets

(56) References Cited

U.S. PATENT DOCUMENTS

| | | | |
|---|---|---|---|
| 2015/0379772 A1* | 12/2015 | Hoffman | G06T 19/006 345/633 |
| 2016/0099751 A1* | 4/2016 | Koehler | G06F 1/163 361/679.26 |
| 2017/0060399 A1* | 3/2017 | Hough | G06F 3/147 |

* cited by examiner

Fig. 1: Electronic Dive Mask System Overview

Figure 2 Underwater Divers

Figure 3 Architectural Diagram

ENHANCED ELECTRONIC DIVE MASK SYSTEM INCORPORATING IMAGE ENHANCEMENT AND CLARIFICATION PROCESSING

PRIORITY CLAIMS

This application is a continuation of U.S. patent application Ser. No. 15/786,467, filed Oct. 17, 2017, which claims the benefit of U.S. Provisional Patent Application No. 62/409,315, filed Oct. 17, 2016, the contents of which are incorporated herein by reference.

BACKGROUND

The ocean covers 71 percent of the earth's surface. Since the dawn of human existence, people have entered the water to collect food. There are artifacts indicating that the people of Mesopotamia engaged in diving to collect pearl oysters as long as 4,500 years ago. The origins of diving trace back to the being of human history. Over time, divers learned to equalize ear pressure as they descended to deeper depths. Eventually, the desire to go deeper and stay underwater for longer periods of time led to the development of systems for underwater breathing, such as helmets supplied with pressurized air through an attached hose. Today one of the most popular means of underwater exploration is scuba diving, where a diver uses a self-contained underwater breathing apparatus (scuba) to breathe underwater. Unlike other modes of diving, which rely either on breath-hold or on breathing supplied under pressure from the surface, scuba divers carry their own source of breathing gas, usually compressed air, allowing them greater freedom of movement than with an air-line or diver's umbilical and longer underwater endurance than breath-hold.

Scuba diving is popular recreationally and professionally in a number of applications including scientific, military and public safety roles. However, for commercial diving it is more common to use surface supplied diving equipment when this is practicable. In either case, with the ability to breathe underwater, divers can now function underwater for extended periods of time and descend to greater depths. However, in order to safely move freely and fully explore the underwater environment, divers also need to be able to see clearly in a wide variety of challenging conditions. Even in ideal conditions, it is generally more difficult to see underwater than through air and typically, underwater viewing conditions are far from ideal. The disclosed invention is a specially constructed electronic dive mask (EDM) system that incorporates a transparent electronic display screen into the viewing window of a divers mask. The diver is then able to select either a normal view or an enhanced view or a combination of the two in order to increase visual clarity. In some embodiments the diver is able to select a blended view that combines the normal view with an enhanced view to create an augmented view of the surrounding environment to improve situational awareness. One of the key requirements for safe scuba diving is the improvement of visibility underwater.

The human eye sees better through air than through water. One of the reason for this is that water is 800 times denser than air. As result, when light enters water, it interacts with the water molecules and particles, resulting in loss of light intensity, color changes, diffusion, loss of contrast and other effects. To get a sense of this effect, consider that an underwater photo of an object one meter away, will be similar to a photo above water at 800 meters. Both photos will look bluish and lack contrast.

Another factor affecting visibility underwater is that sunlight is reflected by the surface of the water and this causes significant changes in visibility and the perception of color underwater. Furthermore, different wavelengths are absorbed differently as the light passes through the water. The shorter the wavelength, the deeper (longer) it will reach before being absorbed. This causes objects to lose their color as a diver goes deeper down or further away.

The most common cause of reduced visibility are particles—live or otherwise—in the water. Bright particles in water reflect and scatter light, resulting in diffusion. A sandy or muddy bottom can easily be kicked up and with small particles it can take a while before the sediment settles again. Shipwrecks and caves are particularly prone to fine silt.

The impact of rough water also affects visibility. Waves and other turbulence will reflect light and cause it to scatter more than a smooth plane. Weather and seasonal factors also come into play. Water run-off from mountains in the spring can increase the velocity of water flow in rivers. This in turn results in more sediment being picked up and carried into nearby bodies of water. From there, prevailing currents can carry the sediment to the dive site. Low visibility creates a multitude of safety risks.

Low visibility can undermine the purpose of the dive, or make it more difficult or less enjoyable. If the purpose of the dive is discovery or inspection, without good visibility it is not possible to do a thorough job. Low visibility during a dive can be dangerous. It increases the risks and stresses of diving. Unfamiliarity and lack of visibility breed fear and increase stress and air consumption. Entanglements, overheads, and other hazards cannot be seen and are more difficult to escape. Gauges may be impossible to read. Murky waters are often polluted, increasing the risk of infection or disease from a minor scratch or cut. An obvious consideration is that when visibility is limited, divers must take care not to bump into objects that can cause serious injuries: reef structures and sharp edges on wrecks are examples.

Some sites are plagued by current as well as by low visibility. When current is present, it is easy to drift off course and become separated from diving buddies. Marine life can pose a serious hazard in low visibility. This can happen because often these animals are on high alert due to an inability to see well. If a diver surprises an animal, it is more likely to attack. Sharks, seals and sea lions, stingrays, and smaller animals are just a few creatures that might feel the need to defend themselves when startled. Panic can happen to anyone, particularly if nitrogen narcosis begins to set in during a low-visibility situation. Divers need to be extra cautious and pay close attention to how they feel while diving at low visibility to prevent problems.

Companies like Oceanic offer diving masks with heads up displays. The Oceanic DATAMASK contains a miniature liquid crystal display (LCD) panel, proprietary digital optic system, microprocessor, depth transducer, wireless cylinder pressure receiver, diver replaceable battery, and controlling software. The miniature LCD allows you to keep your eyes focused on the dive while presenting critical dive data including: current depth, elapsed dive time, cylinder pressure, and dive time remaining. The digital optic system provides a clear, highly magnified image of the LCD, which is viewable regardless of environmental conditions and may be seen clearly by the vast majority of divers, regardless of vision. While this may be considered an advancement in the art, divers require more and more visibility as the scope of underwater tasks becomes more and more complex.

SUMMARY OF THE INVENTION

Underwater divers work in a very difficult environment. Many challenges must be overcome to perform essential tasks—whether maintaining underwater structures, military missions, or recreational activities. As previously noted, a primary challenge divers must deal with is poor vision. Poor contrast, lack of light, cloudy water, and water turbulence all contribute to poor visual acuity. Additionally, a diver must maintain persistent awareness of the environment and monitor a multitude of threats. Temporal considerations limit exposure to depth pressure, remaining oxygen supply, and body temperature. Even external threats must be monitored, be they from predatory sea life, hostile military forces, or unexpected changes in the environment. Adding to these challenges is the difficulty of communicating with other divers and topside personnel. Working underwater is both physically and mentally challenging and characterized by high risk.

The electronic dive mask (EDM) invention addresses these challenges with a unique combination of state-of-the-art technology. The EDM provides a device that significantly improves visual acuity, and in some embodiments includes the option to monitor critical resources, conditions, threats, provides increased situational awareness, and a capability to support multimodal communications with other divers and topside resources.

The elements of import include the display mask, a system processing unit, a user interface with controls, and the display mask ancillary functions. According to the present invention, further image enhancement is provided over what has been offered in the past. Notably, advances in other fields such as the medical instrument imaging field have for the first time been incorporated into a diving mask.

These and other aspects, objects, features and advantages of the present invention, are specifically set forth in, or will become apparent from, the following detailed description of an exemplary embodiment of the invention.

DETAILED DESCRIPTION OF THE PREFERRED EMBODIMENT

An enhanced diving mask according to the present invention has a number of critically important components. Central to the EDM (enhanced—electronic diving mask) as set forth herein is the display mask that mounts on the diver's head and through which the diver looks to observe the underwater environment. The principal component of the display mask is the transparent display panel (TDP). The display mask is interconnected with a second critical system component, the system processing unit (SPU) which is discussed separately below.

Figure 1:
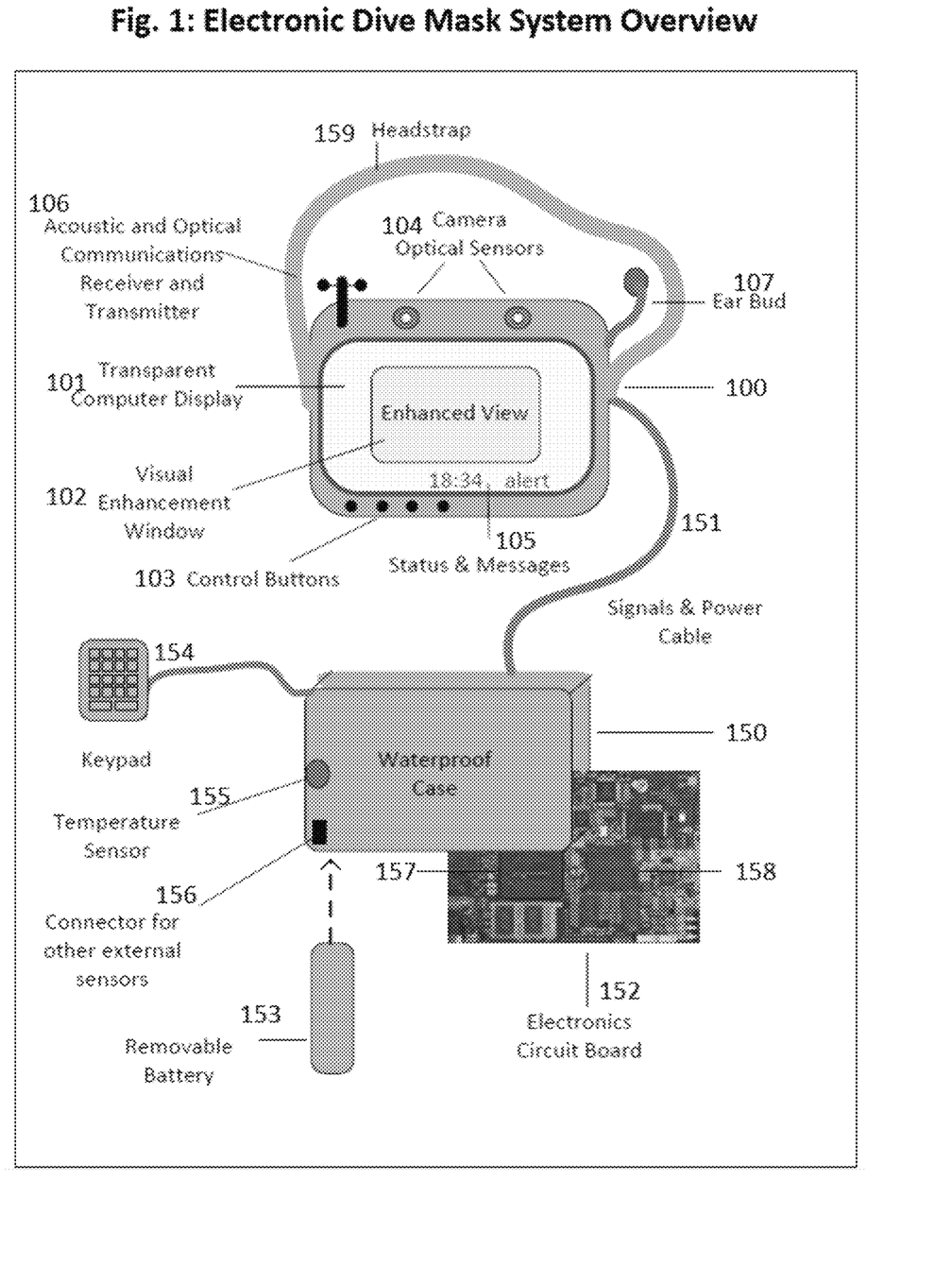
FIG. 1 illustrates the various elements of an enhanced electronic dive mask system according to the present invention.

Also critical to the system is the optical sensor array that consists of one or more optical sensors (cameras). The illustration shows two optical sensors positioned approximately above the diver's eyes to provide a human-like perspective. Additional optical sensors could be positioned to capture views from the sides, top, below, or behind the diver.

Each optical sensor provides a digital video stream to the SPU that is routed through circuitry that contains mathematical algorithms that remove visual occlusions, enhance visual acuity, and perform other selectable enhancement and measurement functions. The enhanced digital video stream can be displayed in real time. In one embodiment, enhanced imagery is displayed in a resizable "Picture-In-Picture" window on the TDP. The diver has parametric control of all aspects on the enhancement window, including size, position, brightness, intensity, and choice of algorithms. In an alternative embodiment, the diver is then able to select either a normal view or an enhanced view or a combination of the two blended to create an augmented view of the surrounding environment in order to increase visual clarity or improve situational awareness.

Buttons for user controls are located on the top and side of the mask for easy access. Various embodiments optionally include on the mask an acoustical and optical communications receiver and transmitter, or ear bugs. In some embodiments, imagery from the dive can be wirelessly transmitted from the EDM to viewed by other members of the dive team using nearby devices.

The EDM thus provides the underwater diver a visually enhanced view as shown in FIG. 1. In addition, according to the present invention, a system processing unit (SPU) is required. The system processing unit is compact computing platform with a removable battery enclosed in a waterproof case that is intended to be worn by the diver attached on a belt around the waist or arm, for example. The SPU is interconnect to the display mask. It provides power for the system. It receives video and still images from the camera and/or optical sensors on the mask. It sends processed video and still images to the display on the mask. It communicates other sensor data between the processing platform and the mask.

In addition, according to the present invention, user interface and controls are provided. The SPU typically includes a user interface and controls that allow user interaction through a keypad attached to the SPU and buttons on the display mask. In some embodiments, an optional temperature sensor is included on the SPU. In some embodiments, status and message indicators are shown on the display mask. In some embodiments, the SPU includes a data storage device where imagery from the dive can be saved.

According to the present invention, a display mask with ancillary functions is taught and disclosed. In addition to the EDM's capability of providing an algorithmically enhanced view, in some embodiments the TDP can provide a general purpose computer display for many types of status messages, alerts, and special purpose software applications resident in the SPU.

The EDM uses the transparent nature of the display to provide a unique capability for application software designed to assist the diver. The SPU provides an overlay capability that enables software applications to "alpha blend" their computer generated text and/or images onto the diver's view varying the visual intensity such that the diver's full field of view is preserved.

A major advantage of the present invention is the addition of image enhancement algorithms. Enhancing live imagery in real time requires sophisticated image processing techniques and tremendous computational throughput. It requires applying these techniques to incoming video streams without introducing delays. The disclosed invention incorporates proprietary real-time video image enhancement technology that implements advanced image processing techniques as algorithms that run on high-performance field-programmable gate arrays (FPGAs). FPGAs provide a suitable processing platform because they allow sophisticated image processing algorithms to be implemented in hardware, where they will run much faster than in software. These image enhancement algorithms can be applied to incoming live video streams to produce dramatically better clarity.

Using sophisticated algorithms to apply mathematical functions to the image matrix, it is possible to reveal hidden layers of visual information without losing detail. This is a purely mathematical approach that utilizes all of the available image information, including portions that are not normally visible to the human eye. A large body of image processing algorithms exists that use techniques including histogram manipulation, convolution, morphology, over- and under sampling, quantization, and spectral processing, including Fourier transforms and Discrete Cosine Transforms (DCTs). These algorithms are in general computationally intensive. Conventional processor technology does not offer the performance necessary to keep pace with the demands of full motion video at up to 60 frames per second (fps), or one frame every 16.67 milliseconds. Processing a Standard-Definition (SD) video stream requires about 150 to 200 gigaflops, while a 1,080p stream requires about 1.2 teraflops. The disclosed invention utilizes FPGAs because they enable the algorithms to be implemented in hardware where they will operate much faster than in software. FPGAs offer deterministic performance, with latencies that are an order of magnitude less than that of GPUs. Furthermore, FPGAs require less power because they use parallel processing and, therefore, can achieve required performance at lower clock frequencies than software processors.

The disclosed invention utilizes several advanced image processing algorithms that can be applied individually or in combination to dramatically improve image clarity and visibility in underwater applications. A global de-haze algorithm is also an important aspect of the present invention. One of the algorithms used in the present invention is the global de-haze algorithm. The global de-haze is designed to take into account the physical processes that go along with atmospheric haze and fog, and the different types of scattering of light underwater or similar phenomena. It tries to take into account the physics of the situation with regard to particular obscuring media that come between the object and the camera. Is it based on knowledge and experience with how different media typically affect the light in terms of treating different wavelengths, or different colors differently, e.g., preferentially using more of the blue or the red, and so on. It then attempts to organize the reconstruction of the image in ways that make sense with the physics in the situation. Like histogram-based algorithms, global de-haze looks at the statistics of the data from the entire image, decides what types of corrections to make, and then applies those corrections by doing the same operation to the entire image. The difference is that it with global de-haze, the gains and offsets applied tend to be more linear because the processes in the physics that degrade image data are correspondingly linear, and the algorithm attempts to mirror those effects.

In addition to a de-haze algorithm, the present invention utilizes a clarifier algorithm. A clarifier algorithm as used in the present invention is a locally adaptive algorithm. Locally adaptive image processing is typically done using a mathematical operation called a convolution kernel. While the underlying mathematics of convolution filtering are complex, performing an image convolution operation is straightforward. A convolution kernel generates a new pixel value based on the relationship between the value of the pixel of interest, and the values of those that surround it. In convolution, two functions are overlaid and multiplied by one another. One of the functions is the video frame image and the other is a convolution kernel. The frame image is represented by a large array of numbers that are pixel values in x- and y-axes. The convolution kernel is a smaller array, or a mask where values are assigned based on the desired filtering function, for example, blur, sharpen, and edge detection. The size of this array, referred to as kernel size, determines how many neighboring pixels will be used to generate a new pixel. In convolution, the kernel operates on the image to create one new pixel each time the mask is applied, and, therefore, the operation must be repeated for every pixel in the image.

Convolutions are computationally intensive and, therefore, most implementations use only small kernels (3×3, 9×9, 16×16). However, using unique, nontraditional programming techniques, the clarifier algorithm is able to implement very large convolution kernels that produce dramatically better results. The reason a very large kernel produces better results has to do with the range and variations in brightness over a given area, which is referred to as spatial frequency. By considering the data in a large neighborhood that is centered around each pixel as it is being processed, a large kernel includes a much greater range of spatial frequencies.

Traditional small kernel processing can only enhance details in the very highest spatial frequencies, which typically contain little of the spectral content (full range of color) of the image, and where noise is prevalent. Hence, small kernel processors must employ high gain to have much noticeable effect on the image. High gain tends to produce sharp outlining artifacts and increases visible noise. Large kernel processing (operating on much more of the "meat" of the image) can produce dramatic results with much lower gain, with the additional benefits of large area shading, yielding much more natural-appearing images with increased local contrast, added dimensionality, and improved visibility of subtle details and features.

The clarifier algorithm uses a very large 400×400 kernel and is designed to clarify the image by removing haze and enhancing image detail. This clarifier algorithm is able to achieve remarkable clarity by removing environmental distortions to reveal more of the real image. It improves dynamic range and contrast.

Naturally, according to the present invention, any multitude of complimentary and non-conflicting algorithms may be used in any combination or in concert to achieve optimal results. By combining algorithms, enhanced results may be achieved according to the present invention. In many types of imagery, the clarifier on its own will provide excellent results, especially when the imagery already contains deep color. The clarifier produces remarkably clear images and brings out detail better than histogram algorithms. However, it does not improve color and if there is not sufficient color in the source imagery, the clarifier may produce images that appear washed out. Therefore, in some cases, such as in underwater imagery it is useful to first apply the global de-haze algorithm before using the clarifier.

The global de-haze algorithm is good at enhancing color and especially useful with water, haze or fog, or other situations where there is not much color. When using the global de-haze with another locally adaptive algorithm such as the clarifier, it is usually preferable to apply it first. This is because, by its nature, it attempts to undo what the physics of the haze or other distortion did to the light initially. The problem with running the locally adaptive clarifier first, is that it would filter out information necessary for the global operation. After the global de-haze removes environmental distortion, then the clarifier locally adaptive algorithm will be more effective working at improve the visibility of low local contrast features of the image than if it were run by itself.

Figure 2:
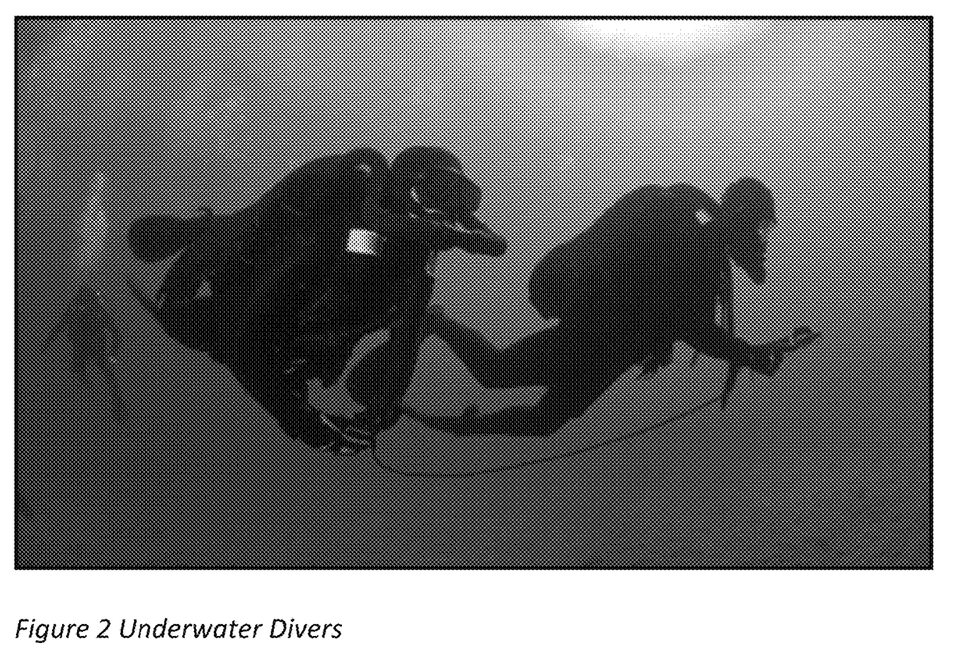
FIG. 2 illustrates one or more underwater divers in an environment where the invention may be used to enhance diving experiences and improve safety.

Before describing the invention in detail, it is useful to describe an exemplary environment within which the invention can be implemented. One such example is that of a diver or divers on a military mission, an example of which is shown in FIG. 2. While executing an underwater dive mission, images of the surrounding environment are captured by one of more cameras on the dive mask. The diver enables the image enhancement feature of the system through the user interface. Video streams from the camera are transmitted live to the system processing unit. The input video stream is routed through the image processing algorithms within the SPU where the imagery is enhanced to improve visual clarity. The enhanced imagery is transmitted to the display screen inside the dive mask. At any time during the dive, the diver can disable or enable the enhancement feature through the user interface. If the diver has enabled record of the video stream, then it will be saved to a data storage device within the SPU.

FIG. 1. further illustrates the various elements of the electronic dive mask system according to an embodiment of the invention. The system includes an electronic dive mask 100 that is connected by an electrical cable 151 to the system processing unit (SPU) 150. The dive mask 100 includes the transparent computer display 101 where a portion of the display is designated as the visual enhancement window 102. A portion of the display may also be used to display status and messages 105. One or more cameras may be built into the mask 104 or they may be attached separately (not shown). The mask may optional include earbuds 107 for communicating with members of the dive team. Control buttons 103 are conveniently located on the mask so the diver can interact with the user interface to enable or disable enhancement features. Acoustic and optical communications receivers and transmitters 106 to allow communications with members of the dive team. A head strap 159 is used to secure the mask to the diver's head.

The SPU is included in a waterproof enclosure 150 which houses the electronic circuit board 152. The electronic circuit board 152 includes an FPGA 157 which is programmed to contain the image processing algorithms and a CPU 158 which runs the user interface and other system control functions. Other electronic components such as memory and input/output interfaces which are typically part of an embedded computer are incorporated into the electronic circuit board (not shown). Also located within the enclosure is a removable battery 153 that provides power to the entire system. A keyboard 154 is attached to the SPU for the diver to interact with the system. Additional components are a temperature sensor 156 and a connector for other external sensors 156. The SPU is attached to the diver's body using a belt or strap (not shown).

FIG. 2. illustrates an underwater environment where the invention may be used by divers to improve the diver's visual clarity, enhance the diving experiences and improve safety.

Figure 3:
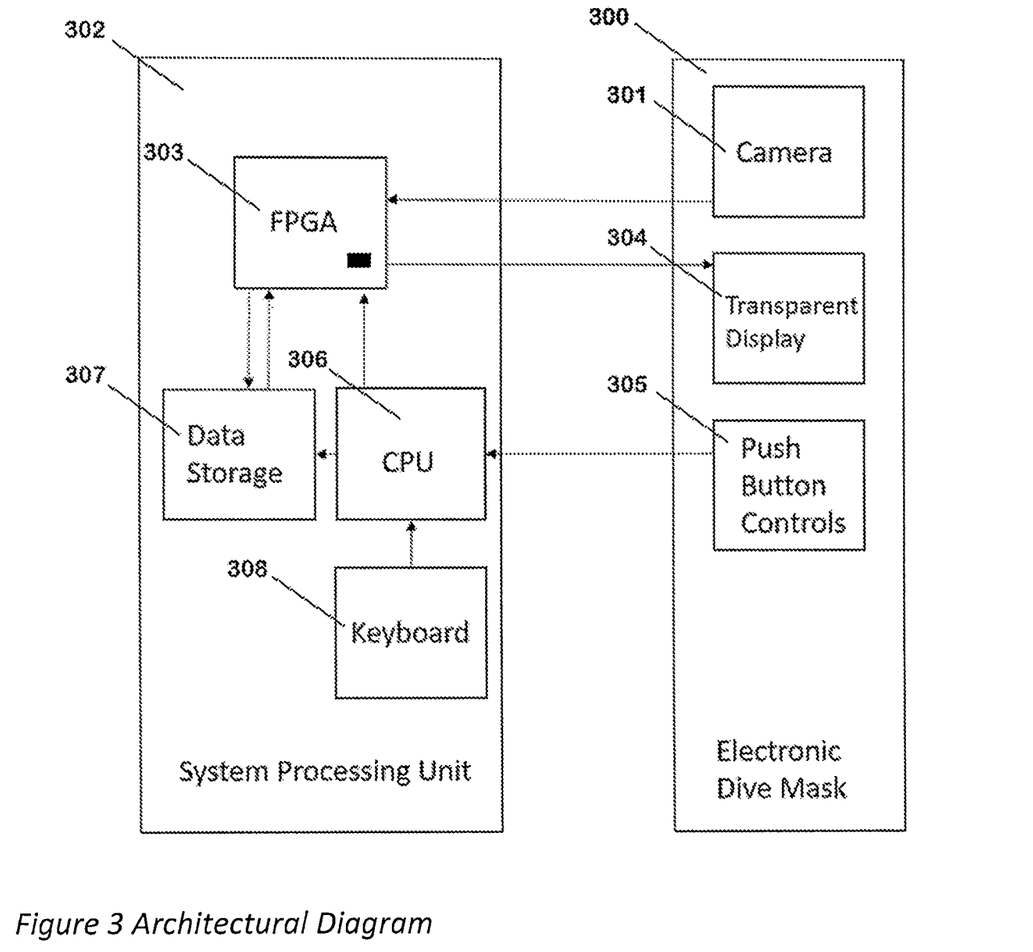
FIG. 3 is a schematic diagram of a system according to the present invention.

FIG. 3. further illustrates the various elements of the electronic dive mask system according to an embodiment of the invention. During an underwater dive, a diver may wish to view enhanced imagery of the surrounding scenery. To enable enhanced imagery, the diver presses one of the push button controls 305 located on the electronic dive mask 300. This sends a signal to the user interface software in the CPU unit 306 located in the system processing unit (SPU) 302 which sends instructions to the FPGA 303 to display a picture-in-picture window within the viewing window of the diver's mask. The user interface software will also send instructions to activate the camera 301 on the dive mask 300 if it is not already active. Once the image enhancement feature is enabled, a video stream is sent from the camera 301 to the FPGA 303 which applies image enhancement algorithms to the imagery on a frame-by-frame basis. The enhanced imagery is then sent to the transparent display 304 on the electronic dive mask 300 where it is displayed within the picture-in-picture window of the transparent display 304. In some cases, the diver may wish to record the imagery captured by the camera. To do so, the diver presses one of the push button controls 305 located on the electronic dive mask 300. This sends a signal to the user interface software in the CPU unit 306 located in the system processing unit (SPU) 302 which sends instructions to the data storage unit 307 to record or save any imagery sent from the camera 301 to the non-volatile storage media. The recorded imagery may be imagery from the camera 301 the is either enhanced or not enhanced depending on the instructions entered by the diver using the push buttons controls 305 on the electronic dive mask 300 or the keyboard 308 attached to the system processing unit (SPU) 302.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

What is claimed is:

1. A user programmable computer for use by an underwater diver, for processing visual data obtained underwater or related to underwater activities, comprising:
   a computer processor coupled to one or more data storage devices, volatile and non-volatile memory devices, one or more data input devices, and an enhanced display device for displaying images from an underwater source;
   a housing capable of withstanding dive pressures while protecting said enhanced display device and associated electronics from the ambient environment associated with said underwater activities;
   a dive helmet adapted to secure said enhanced display device within eyesight of a diver such that the display device is readily visible to said diver, and whereby said diver, while under water, utilizes the one or more data input devices or to input data, store data in the data storage device and process the data so as to cause said programmable computer to function providing a display of such functions visibly to the diver; and wherein said diver may actuate various image enhancement functions provided by said programmable computer to create enhanced images to be displayed upon said enhanced display device and wherein image enhancement with picture in picture functionality is incorporated into said mask.

2. The device according to claim 1 wherein said programmable computer includes visual acuity software for providing an enhanced image to said diver.

3. The device according to claim 1 wherein a de-hazing function is provided by said programmable computer wherein said diver may eliminate the effects of a diving mask that is cloudy due to usage in a moist environment.

4. The device according to claim 1 wherein high performance field-programmable arrays provide said enhanced images.

5. The device according to claim 1 wherein alpha-blending is used to provide images and messages for display to said diver.

* * * * *